(12) United States Patent
Matsuura

(10) Patent No.: US 7,990,581 B2
(45) Date of Patent: Aug. 2, 2011

(54) IMAGE PROCESSING APPARATUS, CONTROL METHOD FOR CONTROLLING THE IMAGE PROCESSING APPARATUS, AND COMPUTER-READABLE STORAGE MEDIUM

(75) Inventor: Tomohiko Matsuura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 12/276,178

(22) Filed: Nov. 21, 2008

(65) Prior Publication Data
US 2009/0135452 A1     May 28, 2009

(30) Foreign Application Priority Data
Nov. 27, 2007   (JP) .................................. 2007-305996

(51) Int. Cl.
*H04N 1/387* (2006.01)
*H04N 1/36* (2006.01)

(52) U.S. Cl. ........ 358/450; 358/474; 358/448; 358/412; 358/413

(58) Field of Classification Search .................. 358/474, 358/448, 450, 483, 412, 413, 497; 382/312, 382/318; 355/51
See application file for complete search history.

(56) References Cited

U.S. PATENT DOCUMENTS

| 5,369,266 A | * | 11/1994 | Nohda et al. | 250/208.1 |
| 5,570,206 A | * | 10/1996 | Yoshinaga | 358/474 |
| 2003/0117674 A1 | * | 6/2003 | Fuse | 358/474 |
| 2009/0059193 A1 | * | 3/2009 | Tanaka | 355/51 |
| 2011/0013202 A1 | * | 1/2011 | Muramatsu | 358/1.2 |

* cited by examiner

*Primary Examiner* — Kimberly A Williams
(74) *Attorney, Agent, or Firm* — Canon U.S.A., Inc., IP Division

(57) ABSTRACT

With reference to any one of a plurality of images, the other images are moved by a distance greater than or equal to one pixel width in a main scanning direction and/or a sub-scanning direction. Then, the plurality of images are combined to form a composite image.

7 Claims, 7 Drawing Sheets

IMAGE PROCESSING APPARATUS, CONTROL METHOD FOR CONTROLLING THE IMAGE PROCESSING APPARATUS, AND COMPUTER-READABLE STORAGE MEDIUM

BACKGROUND OF THE INVENTION

1. Field of the Invention

The present invention relates to an image processing apparatus for combining images picked up and obtained by moving an image detector, a control method for controlling the image processing apparatus, and a computer-readable storage medium.

2. Description of the Related Art

Japanese Patent Laid-Open Nos. 11-215324 and 2005-326260 disclose a method for forming a high-definition image. In this method, a high-definition image is formed by combining a plurality of images obtained by moving an image detector in a main scanning direction and/or a sub-scanning direction to perform an image pickup operation multiple times at different positions displaced from each other by a distance smaller than a width of one pixel (one pixel width).

For example, as illustrated in FIG. 8, an image detector 810 including a plurality of image pickup elements 801 is moved in a main scanning direction and/or a sub-scanning direction to perform an image pickup operation four times at different positions displaced from each other by a 0.5-pixel width. Then, by properly combining the four images obtained, a high-definition image 820 with a resolution doubled in each scanning direction can be obtained.

An image pickup element having poor output characteristics is often included in an image detector, and is generally referred to as a defective pixel. It is a widespread practice to correct such a defective pixel on the basis of normal pixels therearound. FIG. 9 illustrates the image detector 810 including a defective pixel 901. If a plurality of images picked up by this image detector 810 at different positions displaced from each other by a distance smaller than one pixel width are combined together, the resulting defective pixels 901 are adjacent to each other. As a result, the accuracy of the above-described correction based on normal pixels around a defective pixel will be degraded.

It may be possible to perform defect correction of a plurality of images individually before combining them to form a high-definition image. However, in view of spatial resolution of images, it is apparent that the accuracy of such correction is lower than that of the correction described above.

SUMMARY OF THE INVENTION

The present invention has been made to solve the problems described above. The present invention provides a technique for combining a plurality of images to form a high-quality high-definition image without degrading the accuracy of correction of a defective pixel.

Further features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Figure 1:
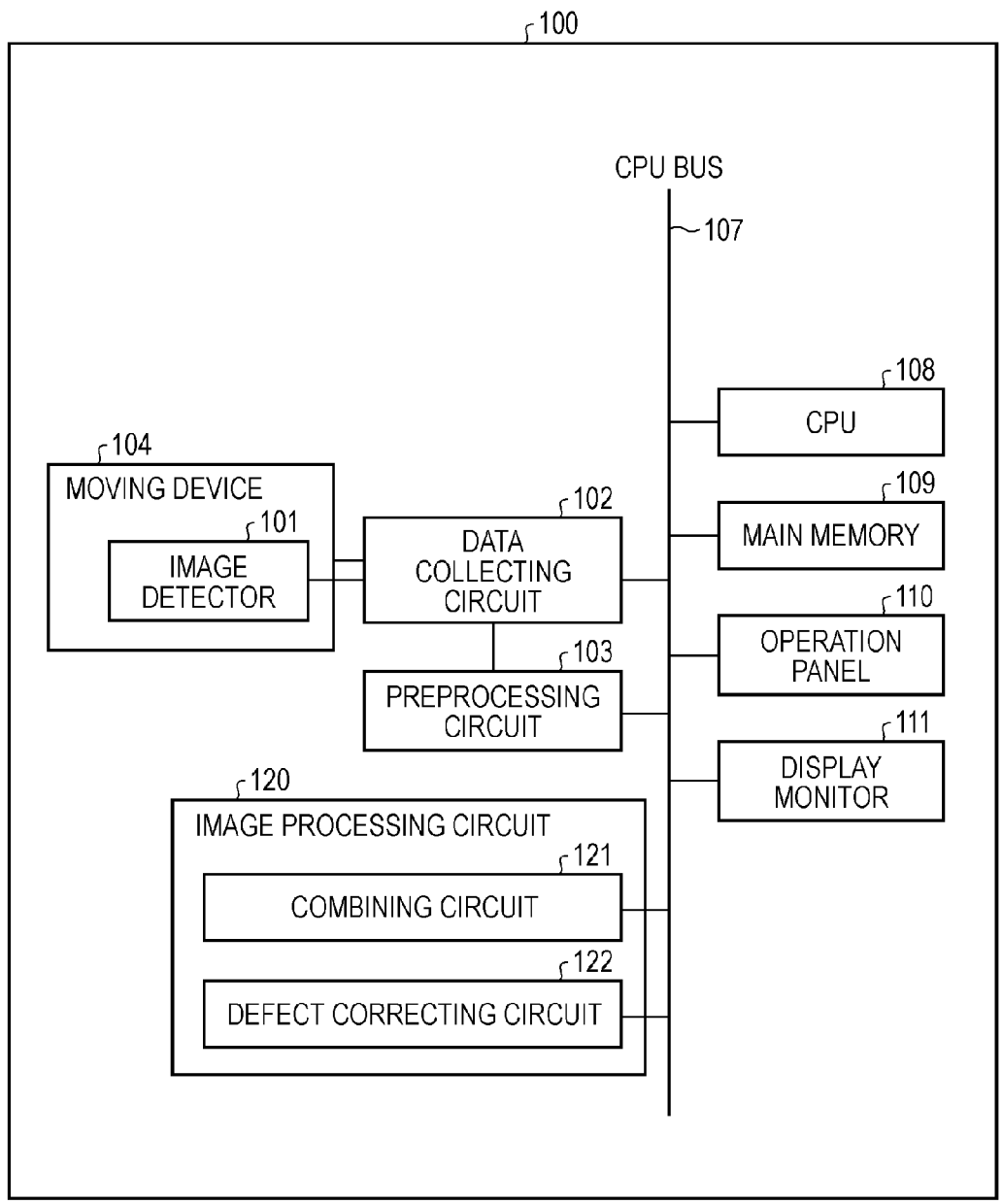
FIG. 1 is a block diagram illustrating a configuration of a first exemplary embodiment of the present invention.

FIG. 1 illustrates an image processing apparatus 100 according to a first exemplary embodiment of the present invention. The image processing apparatus 100 is capable of combining a plurality of images to form a high-definition image. The image processing apparatus 100 includes a preprocessing circuit 103, a central processing unit (CPU) 108 serving as a control unit, a maim memory 109, an operation panel 110, a display monitor 111, and an image processing circuit 120. In the image processing apparatus 100, data is transmitted and received via a CPU bus 107.

The image processing apparatus 100 further includes a data collecting circuit 102 connected to the preprocessing circuit 103, and an image detector 101 and a moving device 104 that are connected to the data collecting circuit 102, which is connected to the CPU bus 107. The image detector 101 has a plurality of pixels and picks up detected light as an image. That is, the image detector 101 converts an optical image to an image signal and picks up the image signal as an image.

The image processing circuit 120 includes a combining circuit 121 and a defect correcting circuit 122. The combining circuit 121 serves as a combining unit and combines a plurality of images to form a composite image. The defect correcting circuit 122 performs defect correction on an image.

The maim memory 109 stores various types of data necessary for processing in the CPU 108. At the same time, the maim memory 109 includes a work memory serving as a work area for the CPU 108. According to an operation from the operation panel 110, the CPU 108 controls operation of the entire apparatus using the maim memory 109.

Figure 2:
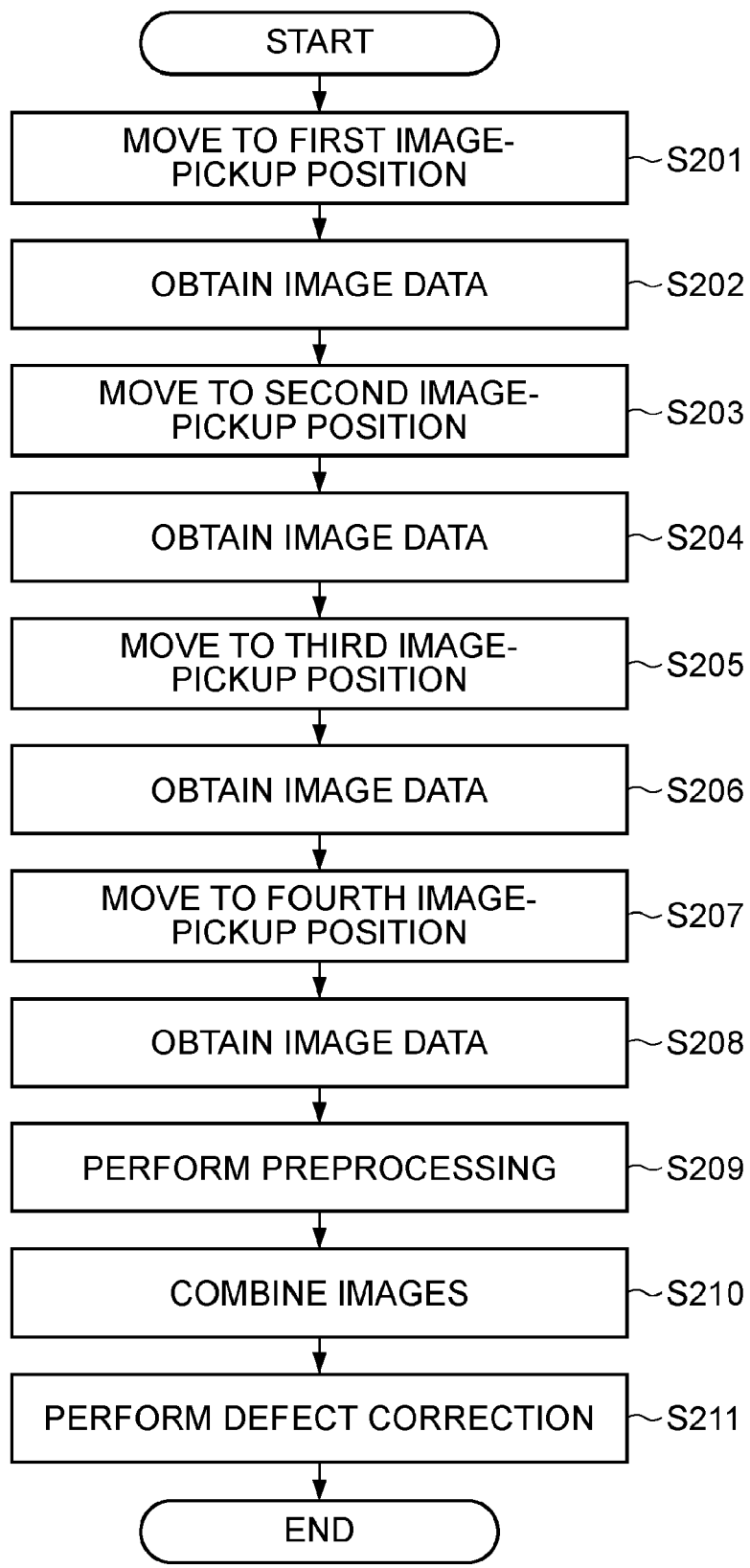
FIG. 2 illustrates a flow of processing performed in an image processing apparatus according to the first or second exemplary embodiment of the present invention.
Figure 3:
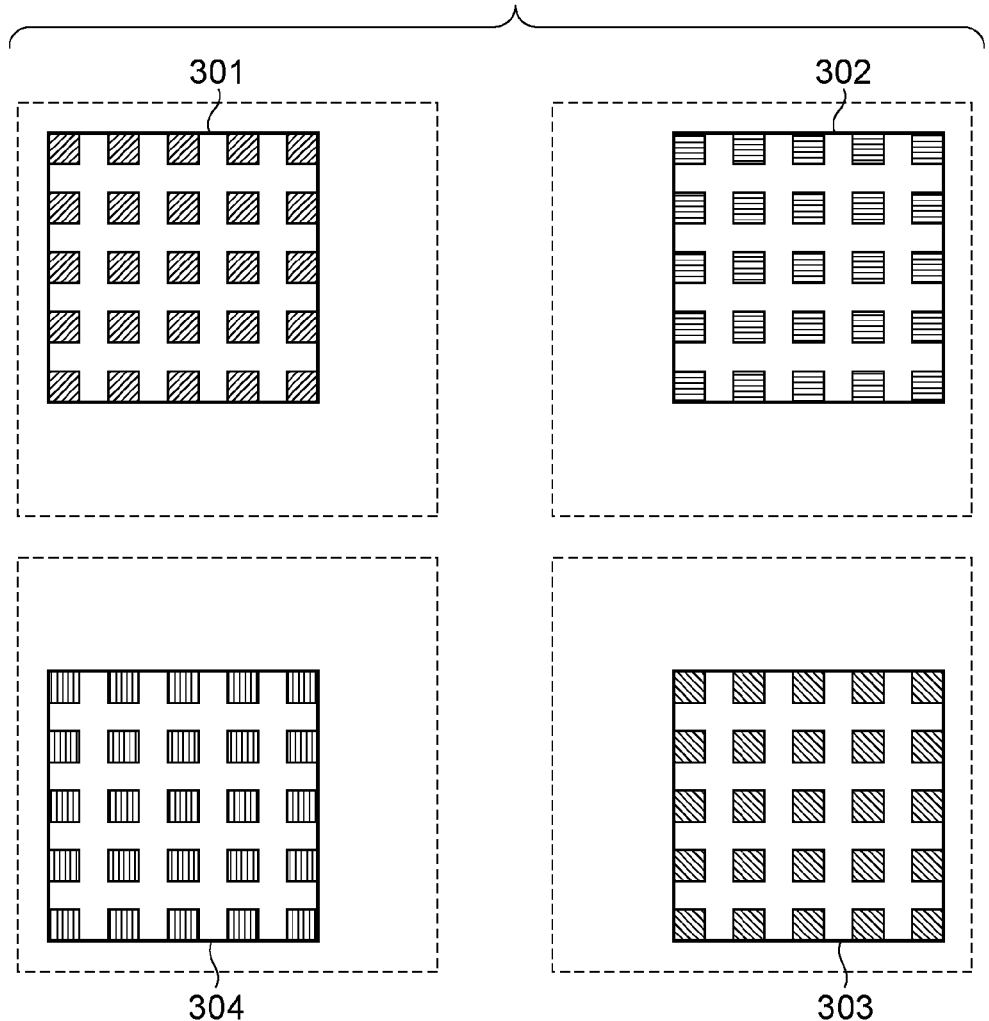
FIG. 3 illustrates images picked up according to the first, second, or third exemplary embodiment of the present invention.
Figure 4:
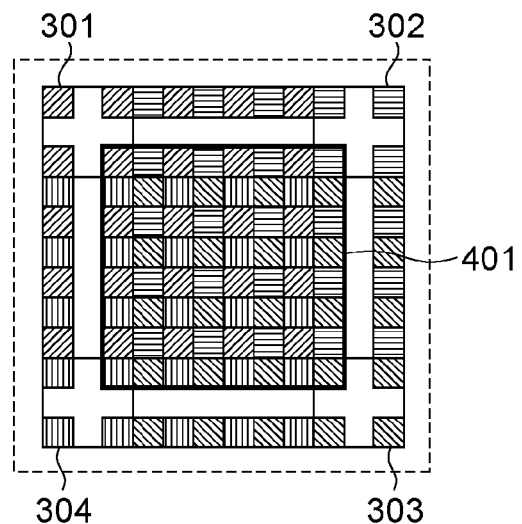
FIG. 4 illustrates a composite image formed according to the first, second, or third exemplary embodiment of the present invention.

FIG. 2 is a flowchart illustrating a flow of control processing performed during operation of the image processing apparatus 100. FIG. 3 illustrates a plurality of images (first to fourth images) 301 to 304 picked up by the image detector 101. FIG. 4 illustrates a composite image 401 obtained by combining the plurality of images 301 to 304. Program code corresponding to the flowchart of FIG. 2 is stored in the maim memory 109 or in a read-only memory (ROM) (not shown), and read and executed by the CPU 108.

Hereinafter, a flow of processing performed during operation of the image processing apparatus 100 will be described with reference to FIG. 2 to FIG. 4. First, the data collecting circuit 102 drives the moving device 104 serving as a moving unit to move the image detector 101 to a first image-pickup position (step S201). Next, the data collecting circuit 102 drives the image detector 101 to pick up an image of a subject (not shown) and obtains the first image 301 at the first image-pickup position (step S202). Next, the data collecting circuit 102 drives the moving device 104 to translate the image detector 101 in a main scanning direction to a second image-pickup position (step S203). In the present embodiment, at this point, a distance by which the image detector 101 is moved is 1.5 times a pixel width of an image pickup element included in the image detector 101. Next, in the same manner as that in step S202, the data collecting circuit 102 drives the image detector 101 to pick up an image of the subject and obtains the second image 302 at a second image-pickup position (step S204). Then, the data collecting circuit 102 drives the moving device 104 to move the image detector 101 in a sub-scanning direction by a distance 1.5 times the above-described pixel width to a third image-pickup position (step S205) and obtains the third image 303 (step S206). Likewise, the data collecting circuit 102 drives the moving device 104 to move the image detector 101 to a fourth image-pickup position (step S207) and obtains the fourth image 304 (step S208). In the present embodiment, a plurality of images are picked up in the above-described order. However, the order is not limited to this. That is, images can be picked up in any order.

The first to fourth images 301 to 304 obtained in step S201 to step S208 are supplied from the data collecting circuit 102 to the preprocessing circuit 103 and subjected to general preprocessing, such as offset correction and gain correction (step S209).

Next, the combining circuit 121 included in the image processing circuit 120 moves the preprocessed images 301 to 304 according to their corresponding image-pickup positions and combines them to form the composite image 401 (step S210). If an interpolating circuit is added to the present configuration and images around the composite image 401 are generated by interpolation, it is possible to avoid reduction of an effective area. Here, in the coordinates of the composite image 401, the second, third, and fourth images 302, 303, and 304 are moved by a distance 1.5 times the pixel width and combined with the first image 301.

Finally, the defect correcting circuit 122 included in the image processing circuit 120 performs defect correction on the composite image 401 (step S211). Defect correction is generally achieved by generating, on the basis of normal pixels (non-defective pixels) around a defective pixel to be corrected, a pixel value of the defective pixel. In the simplest method, a pixel value of a defective pixel is substituted by an average of pixel values of normal pixels among four or eight pixels adjacent to the defective pixel. In the present embodiment, the distance by which the image detector 101 is moved in steps S203, 205, and 207 is a 1.5-pixel width in each scanning direction. Thus, since it is unlikely that defective pixels will be brought adjacent to each other in the composite image 401, defect correction can be made with high accuracy. In general, a position of a defective pixel is identified in the manufacturing process of the image detector 101 and stored inside the image processing apparatus 100 (e.g., in the defect correcting circuit 122) in advance as information unique to the image detector 101. Since positions at which the first to fourth images 301 to 304 are combined together in step S210 are given, it is possible to find the positions of defective pixels in the composite image 401 according to the position of a defective pixel in the image detector 101. Alternatively, a defect detecting circuit may be added to the present configuration so that periodically or every time an image pickup operation is performed, the positions of defective pixels in the first to fourth images 301 to 304 or in the composite image 401 can be detected and used.

According to the first exemplary embodiment described above, it is possible to reduce possibility that defective pixels will be brought adjacent to each other during formation of a composite image. Since a plurality of images are moved by a 1.5-pixel width in the main scanning direction and/or sub-scanning direction to form a composite image, the possibility that defective pixels will be brought adjacent to each other in the composite image can be greatly reduced. Moreover, it is possible to produce a composite image having a resolution higher than that of a single image. That is, a high-resolution high-quality image can be obtained.

For simplicity, in the present embodiment, there are provided a total of 4 (2×2) image pickup positions in a matrix, where 2 positions are present in a row in the main scanning direction and 2 positions are present in a column in the sub-scanning direction. Here, the image detector 101 is moved by a 1.5-pixel width in each scanning direction. This is, however, the simplest example. Generally, it is possible to pick up an image at a total of M×N positions in a matrix, where M is the number of image pickup positions in a row in the main scanning direction and N is the number of image pickup positions in a column in the sub-scanning direction. In this case, the image detector 101 is moved by an (m+1/M)-pixel width in the main scanning direction and by an (n+1/N)-pixel width in the sub-scanning direction, where m and n are integers greater than or equal to 1. Thus, the same effect as that of the present embodiment can be achieved.

Figure 5:
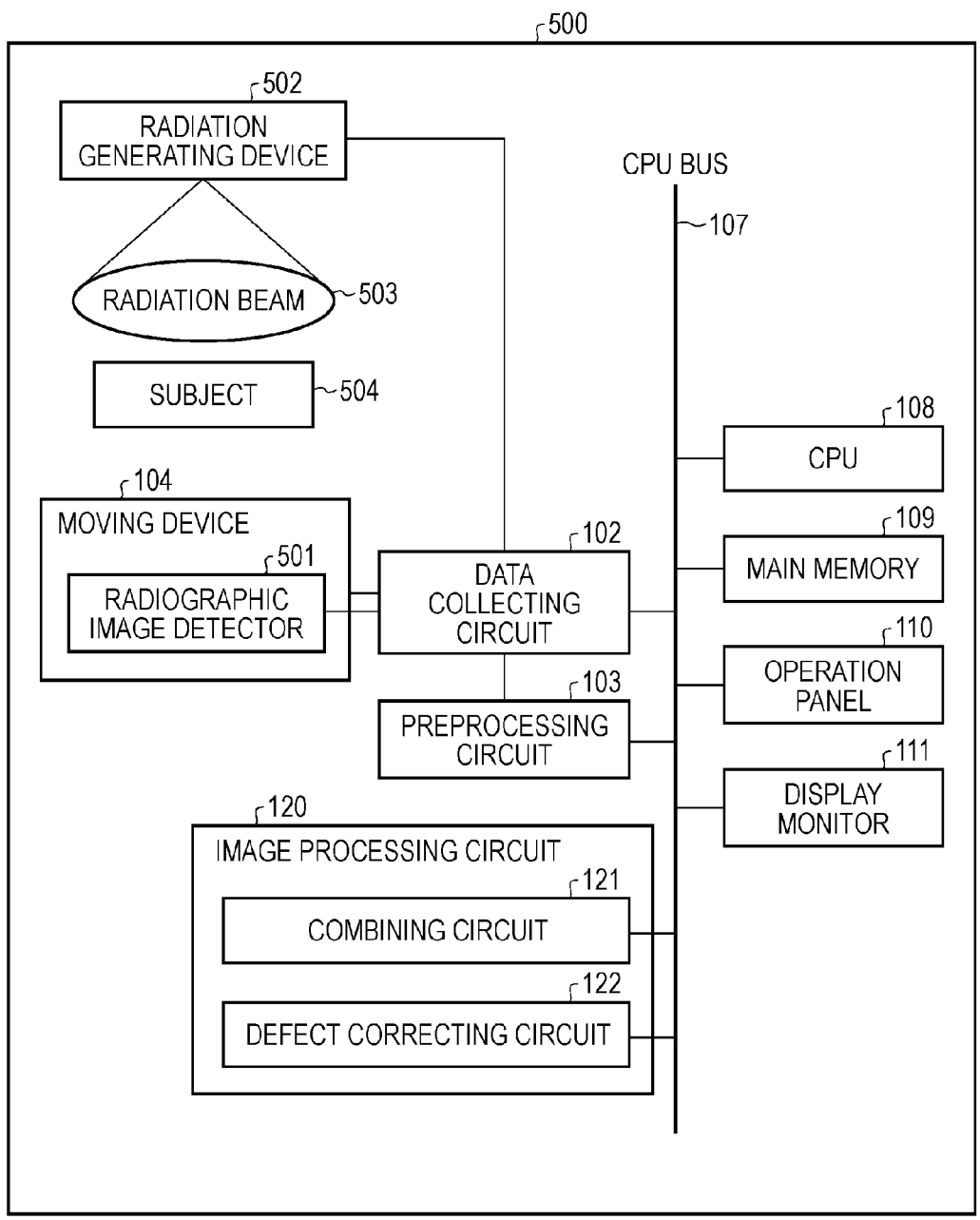
FIG. 5 is a block diagram illustrating a configuration of the second exemplary embodiment of the present invention.

FIG. 5 illustrates an image processing apparatus 500 according to a second exemplary embodiment of the present invention. The image processing apparatus 500 is different from the image processing apparatus 100 of the first exemplary embodiment in that a radiographic image detector 501 is provided instead of the image detector 101. A radiographic image transmitted through a subject is converted to an image signal and picked up as an image by the radiographic image detector 501.

Other differences with the first exemplary embodiment are that there are provided a radiation generating device 502, a radiation beam 503, and a subject 504 to be tested. Hereinafter, differences with the first exemplary embodiment will be primarily described.

First, the data collecting circuit 102 drives the moving device 104, which serves as a moving unit for moving the radiographic image detector 501, to move the radiographic image detector 501 to the first image-pickup position (step S201). Next, under the control of the data collecting circuit 102, the radiation generating device 502 and the radiographic image detector 501 are driven, and the radiation beam 503 is applied to the subject 504. The radiation beam 503 from the radiation generating device 502 passes through the subject 504 while attenuating, reaches the radiographic image detector 501, and is output as the first image 301 (see FIG. 3) by the radiographic image detector 501 (step S202). Then, as in the case of the first exemplary embodiment, the data collecting circuit 102 drives the moving device 104 to move the radiographic image detector 501 to the second, third, and fourth image-pickup positions, at each of which the radiographic image detector 501 obtains an image of the subject 504 (steps S203 to S208). The present embodiment is characterized in that, at each of the image pickup positions, the radiation generating device 502 is driven together with the radiographic image detector 501, and the radiation beam 503 is applied to the subject 504.

The four images obtained in steps S201 to 208 are subjected to preprocessing (step S209), combined (step S210), and subjected to defect correction (step S211) by the corresponding circuits. These processing steps will not be described here, as they are the same as those in the first exemplary embodiment.

According to the second exemplary embodiment described above, a high-definition radiographic image can be obtained by combining a plurality of radiographic images. Since a plurality of radiographic images are moved by a 1.5-pixel width in the main scanning direction and/or sub-scanning direction to form a composite radiographic image, it is possible to greatly reduce the possibility that defective pixels will be brought adjacent to each other in the composite radiographic image. Thus, defect correction can be made with high accuracy, and a high-resolution high-quality radiographic image can be obtained.

Figure 6:
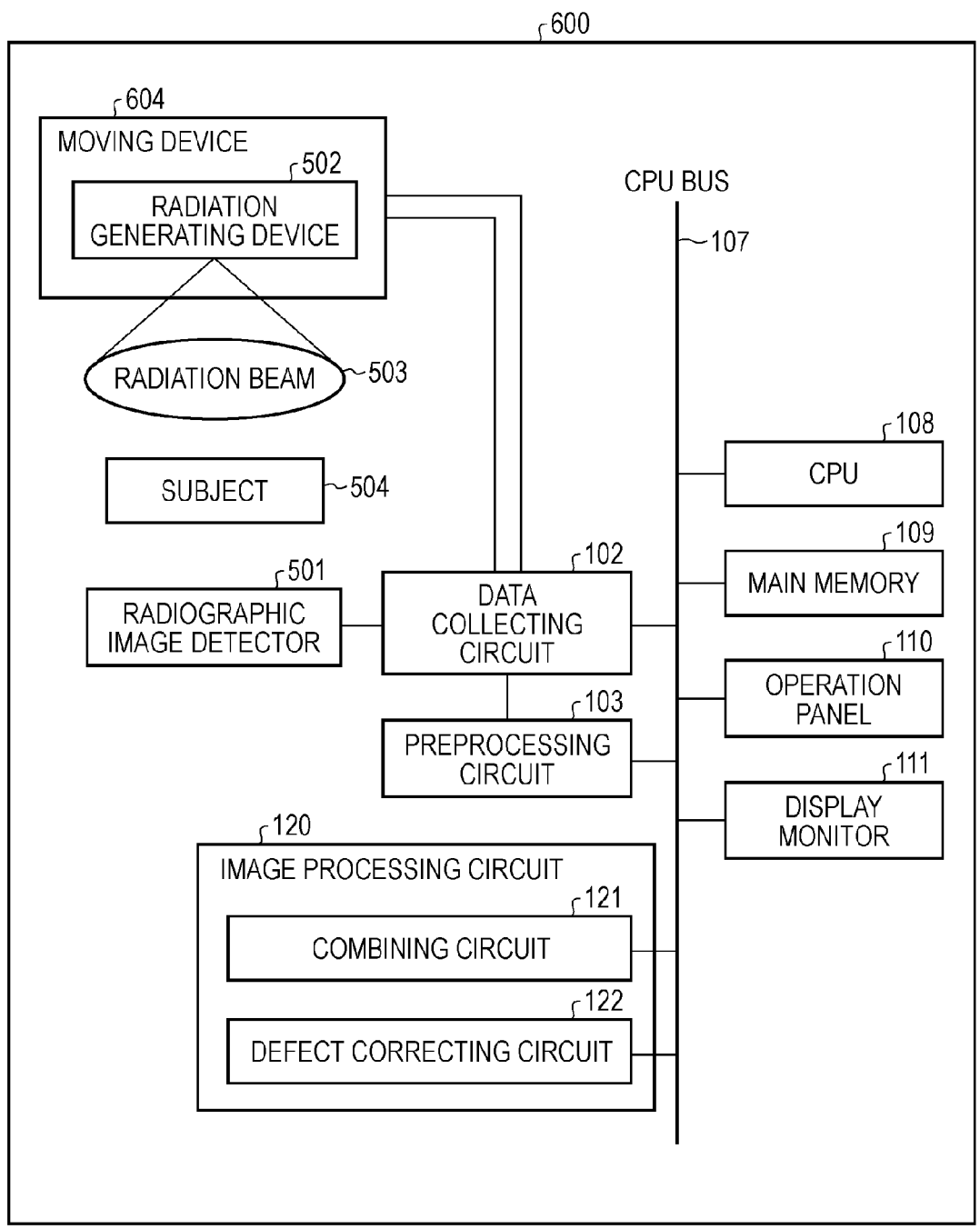
FIG. 6 is a block diagram illustrating a configuration of the third exemplary embodiment of the present invention.

FIG. 6 illustrates an image processing apparatus 600 according to a third exemplary embodiment of the present invention. The image processing apparatus 600 is different from the image processing apparatus 500 of the second exemplary embodiment in that the moving device 104 configured to move the radiographic image detector 501 in the second exemplary embodiment is provided as a moving device 604 for moving the radiation generating device 502 in the present embodiment. Hereinafter, differences with the second exemplary embodiment will be primarily described.

Figure 7:
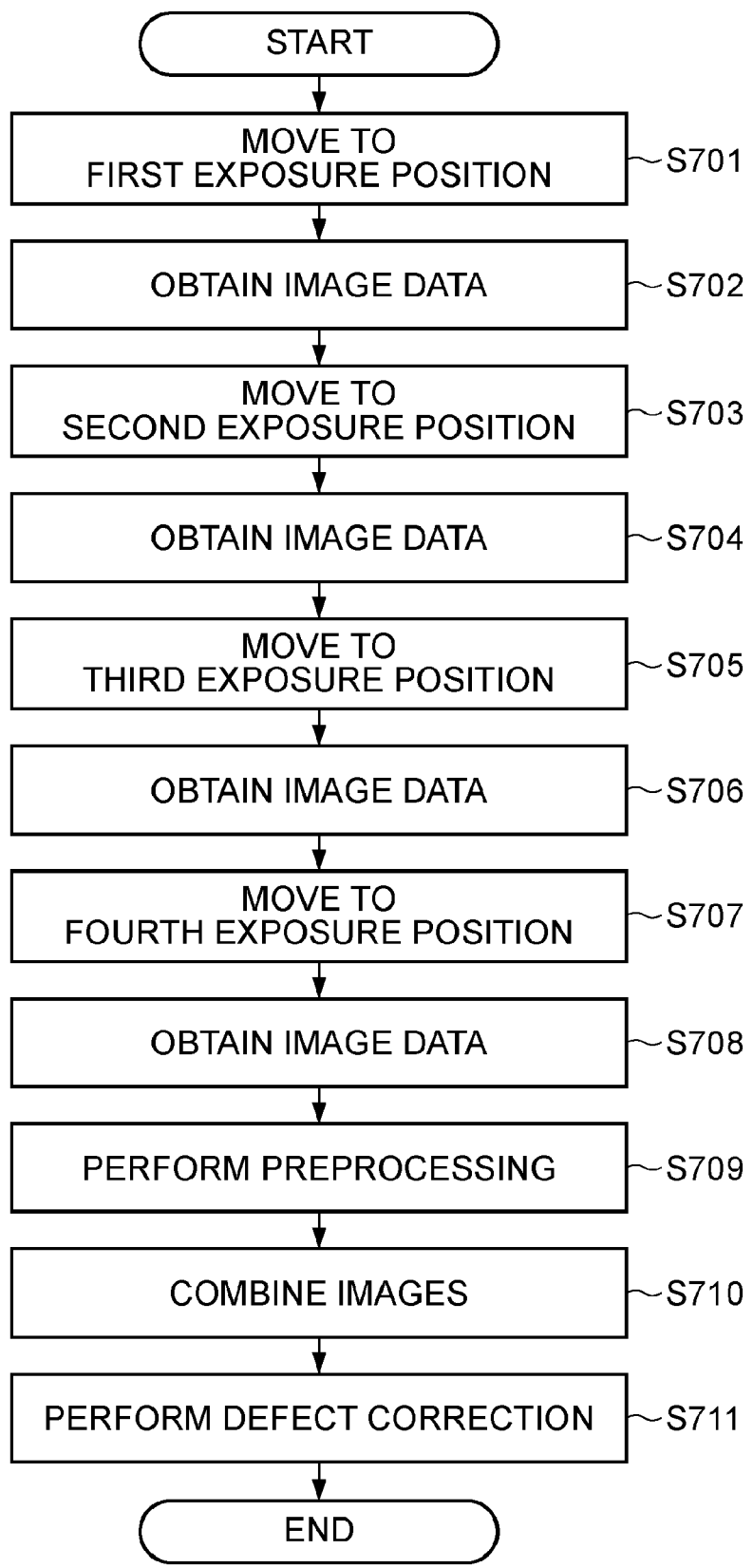
FIG. 7 illustrates a flow of processing performed in an image processing apparatus according to the third embodiment exemplar of the present invention.
Figure 8:
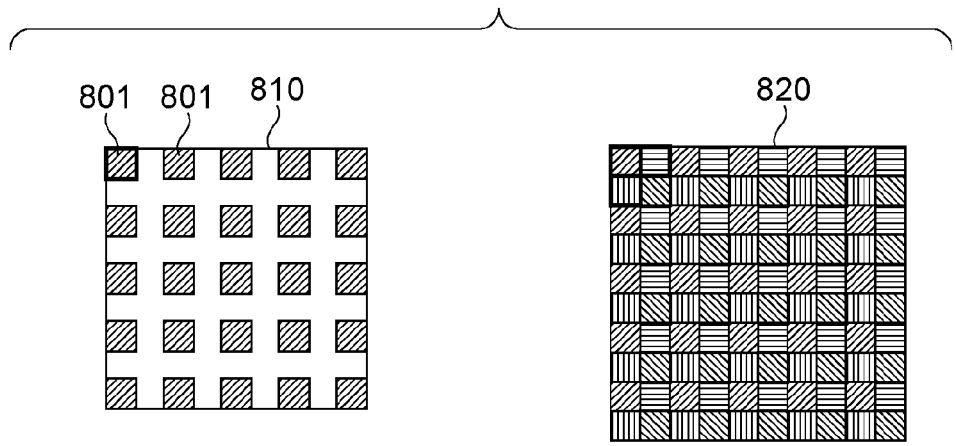
FIG. 8 illustrates principles of the related art.
Figure 9:
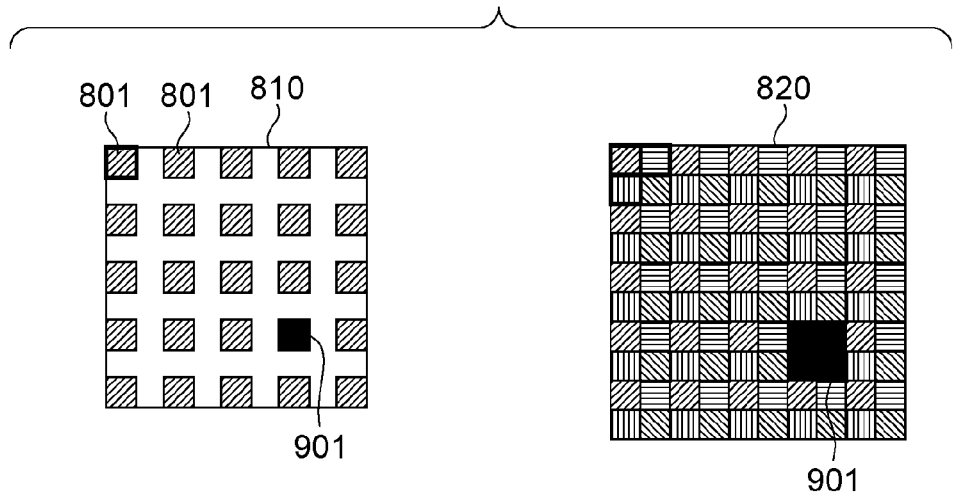
FIG. 9 illustrates problems of the related art.

FIG. 7 is a flowchart illustrating a flow of control processing performed during operation of the image processing apparatus 600. First, the data collecting circuit 102 drives the moving device 604 to move the radiation generating device 502 to a first exposure position (step S701). Next, under the control of the data collecting circuit 102, the radiation generating device 502 and the radiographic image detector 501 are driven, and the radiation beam 503 is applied to the subject 504. The radiation beam 503 from the radiation generating device 502 passes through the subject 504 while attenuating, reaches the radiographic image detector 501, and is output as the first image 301 (see FIG. 3) by the radiographic image detector 501 (step S702). Next, the data collecting circuit 102 drives the moving device 604 to move the radiation generating device 502 to a second exposure position in a direction corresponding to the main scanning direction of the radiographic image detector 501 (step S703). Here, the radiation generating device 502 is moved, for example, by a distance 1.5 times a pixel width of an image pickup element included in the radiographic image detector 501. Next, in the same manner as that in step S702, the data collecting circuit 102 drives the radiation generating device 502 and the radiographic image detector 501 to obtain the second image 302 at the second exposure position (step S704). Then, the data collecting circuit 102 drives the moving device 604 to move the radiation generating device 502 in a direction corresponding to the sub-scanning direction of the radiographic image detector 501 by a distance 1.5 times the above-described pixel width to a third exposure position (step S705) and obtains the third image 303 (step S706). Likewise, the data collecting circuit 102 drives the moving device 604 to move the radiation generating device 502 to a fourth exposure position (step S707) and obtains the fourth image 304 (step S708).

The four images obtained in steps S701 to 708 are subjected to preprocessing (step S709), combined (step S710), and subjected to defect correction (step S711) by the corresponding circuits. These processing steps will not be described here, as they are the same as steps S209 to S211 in the first exemplary embodiment.

According to the third exemplary embodiment described above, a high-definition radiographic image can be obtained by combining a plurality of radiographic images. Since a plurality of radiographic images are moved by a 1.5-pixel width in the main scanning direction and/or sub-scanning direction to form a composite radiographic image, it is possible to greatly reduce the possibility that defective pixels will be brought adjacent to each other in the composite radiographic image. Thus, defect correction can be made with high accuracy, and a high-resolution high-quality radiographic image can be obtained.

Note that the present invention can be applied to an apparatus constituted by a single device or to a system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and DVD-R).

As for the method of supplying the program, a client computer can be connected to a website on the Internet using a browser of the client computer, and the computer program of the present invention or an automatically-installable compressed file of the program can be downloaded to a recording medium, such as a hard disk. Further, the program of the present invention can be supplied by dividing the program code constituting the program into a plurality of files and downloading the files from different websites. In other words, a World Wide Web (WWW) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board in the computer or to a memory included in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2007-305996 filed on Nov. 27, 2007, the entire contents of which are hereby incorporated by reference herein.

What is claimed is:

1. An image processing apparatus comprising:
    an image detector having a plurality of pixels and configured to convert an optical image into an image signal to pick up the image signal as an image;
    a moving unit configured to move the image detector from a first position by a distance greater than or equal to a pixel width;
    a control unit configured to control the image detector and the moving unit such that a first image is picked up by the image detector at the first position, and that a second image is picked up by the image detector at a second position displaced from the first position by the distance greater than or equal to the pixel width; and
    a combining unit configured to combine the first image and the second image to form a composite image by changing, in coordinates of the composite image, coordinates of the second image to values corresponding to the distance.

2. The image processing apparatus according to claim 1, wherein the control unit controls the image detector and the moving unit such that the image detector is moved in a main scanning direction and/or a sub-scanning direction to obtain images at a plurality of positions displaced from each other by the distance greater than or equal to the pixel width.

3. The image processing apparatus according to claim 2, wherein the image detector is moved to a total of M×N positions including the first position, where M is the number of positions arranged in a row of a matrix in the main scanning direction and N is the number of positions arranged in a column of the matrix in the sub-scanning direction, so as to obtain the images at the respective M×N positions; and
    the image detector is moved by an (m+1/M)-pixel width in the main scanning direction and an (n+1/N)-pixel width in the sub-scanning direction, where m and n are integers greater than or equal to 1.

4. The image processing apparatus according to claim 1, further comprising a radiation generating device configured to cause a subject to be exposed to radiation,
    wherein the image detector is a detector that converts radiation to an image signal to pick up the image signal as an image.

5. The image processing apparatus according to claim 4, further comprising a moving unit configured to translate the radiation generating device in a direction corresponding to a main scanning direction and/or a sub-scanning direction of the image detector,
    wherein the radiation generating device is moved to a plurality of positions to obtain the images at the respective positions.

6. A control method for controlling an image processing apparatus that combines a plurality of images obtained by an image detector to form a composite image, the control method comprising the steps of:
    causing the image detector to pick up a first image at a first position;
    causing the image detector to pick up a second image at a second position displaced from the first position by a distance greater than or equal to a pixel width of the image detector; and
    combining the first image and the second image to form the composite image by changing, in coordinates of the composite image, coordinates of the second image to values corresponding to the distance.

7. A computer-readable storage medium configured to store a program for causing a computer to execute the control method of claim 6.

* * * * *